(12) United States Patent
Kim et al.

(10) Patent No.: US 8,422,600 B2
(45) Date of Patent: Apr. 16, 2013

(54) APPARATUS AND METHOD FOR ESTIMATING PHASE ERROR BASED ON VARIABLE STEP SIZE

(75) Inventors: Pansoo Kim, Daejon (KR); Dae-Ig Chang, Daejon (KR); Ho-Jin Lee, Daejon (KR); Jin-Young Kim, Seoul (KR); Jae-Sung Park, Seoul (KR); Young-Sun Lim, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 765 days.

(21) Appl. No.: 12/536,856

(22) Filed: Aug. 6, 2009

(65) Prior Publication Data
US 2010/0091913 A1 Apr. 15, 2010

(30) Foreign Application Priority Data
Oct. 10, 2008 (KR) ........................ 10-2008-0099497

(51) Int. Cl.
*H04L 27/06* (2006.01)
*H03M 13/03* (2006.01)

(52) U.S. Cl.
USPC .......................................... 375/341; 714/786

(58) Field of Classification Search .................. 375/259, 375/260, 261, 262, 263, 265, 316, 340, 341; 714/699, 746, 786, 795
See application file for complete search history.

(56) References Cited

U.S. PATENT DOCUMENTS
6,801,588 B1 * 10/2004 Yamaguchi ................... 375/341
2005/0058224 A1   3/2005 Alagha et al.

FOREIGN PATENT DOCUMENTS
KR   2004-0034566    4/2004
KR   2006-0132744 A  12/2006

OTHER PUBLICATIONS

'Iterative Phase Offst Estimation for Mobile Broadband Satellite Internet Systems' (Vehicular Technology Conference, VTC2006-Spring. IEEE 63rd, vol. 6, pp. 2617-2620, May 2006).

* cited by examiner

*Primary Examiner* — David C. Payne
*Assistant Examiner* — Vineeta Panwalkar
(74) *Attorney, Agent, or Firm* — Rabin & Berdo, P.C.

(57) ABSTRACT

Disclosed is a phase error estimating an apparatus and a method which provides improved convergence speed and tracking speed even in mobile channel environment by variably applying the step size for phase error estimation according to channel status. The apparatus for estimating a phase error includes: a posterior probability (APP) average calculating unit for calculating an APP average value from a soft decision result of a currently received symbol; a step size determining unit for determining a step size variably according to channel status; and a phase error estimating unit for estimating a phase error of the currently received symbol from a phase error of a previously received symbol and the APP average value by using the variably determined step size.

12 Claims, 9 Drawing Sheets

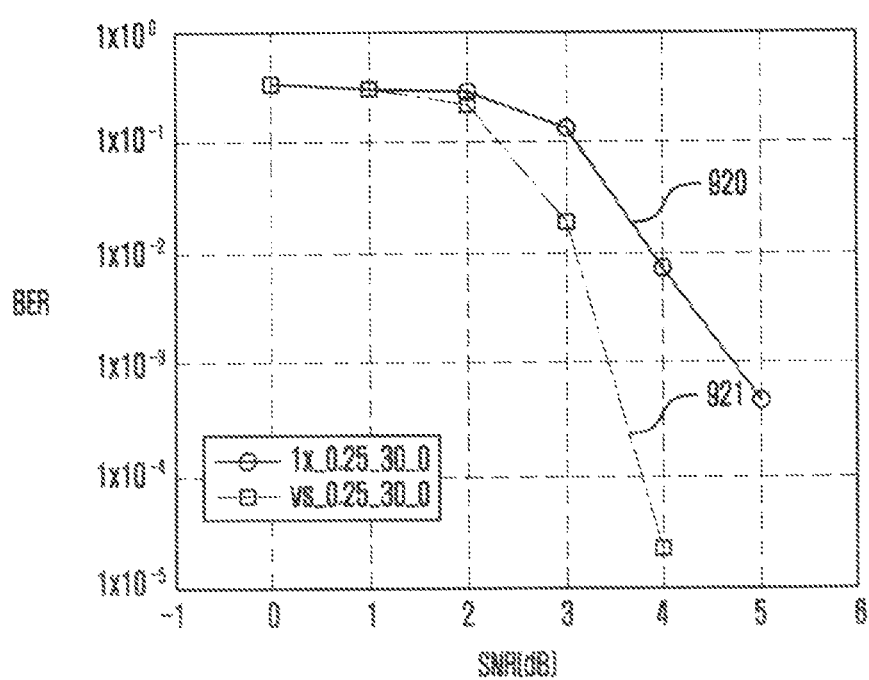

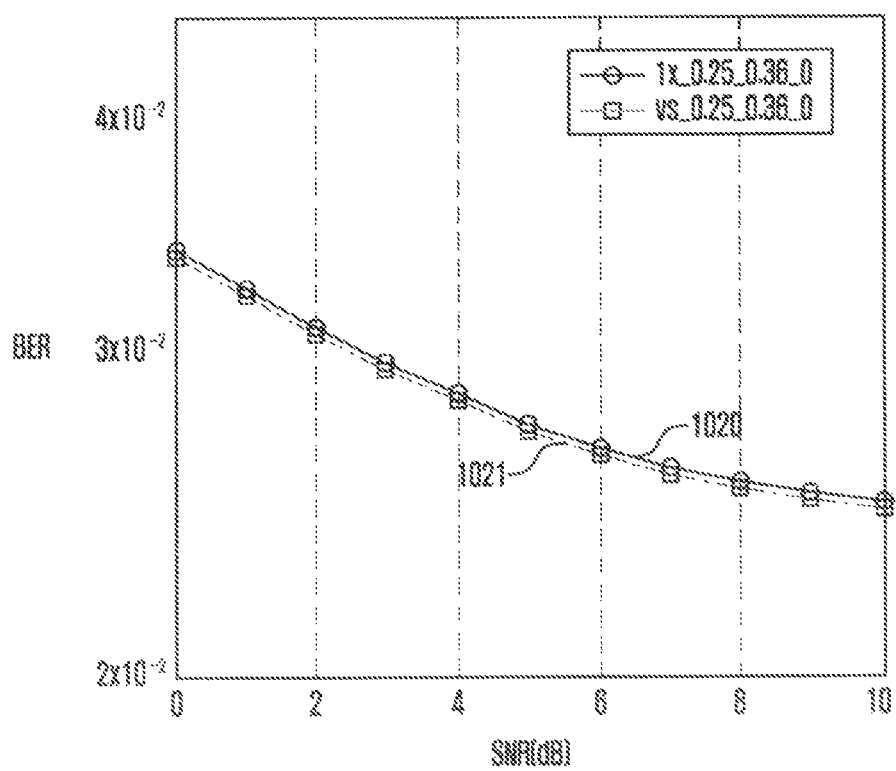

APPARATUS AND METHOD FOR ESTIMATING PHASE ERROR BASED ON VARIABLE STEP SIZE

CROSS-REFERENCE TO RELATED APPLICATIONS

The present invention claims priority of Korean Patent Application No. 10-2008-0099497, filed with Korean Intellectual Property Office on Oct. 10, 2008, which is incorporated herein by reference.

BACKGROUND OF THE INVENTION

1. Field of the Invention

The present invention relates to an apparatus and method for estimating a phase error; and, more particularly, to an apparatus and method for estimating a phase error based on a variable step size, which provides improved convergence speed and tracking speed even in mobile channel environment by variably applying the step size for phase error estimation according to channel status.

2. Description of Related Art

Since a turbo code is superior in view of performance and flexibility, it has been adopted as standards of various wireless communication services. In particular, carrier synchronization should be perfectly achieved in a synchronization block of a demodulator in order to obtain ideal performance in a low signal-to-noise ratio (SNR).

In general, a phase error is estimated and recovered using data symbol for carrier phase synchronization in burst transmission such as Digital Video Broadcasting-Return Channel System via Satellite (DVB-RCS) standard. However, this method is difficult to operate in an environment where SNR is low and a residual frequency error is great.

However, if an iterative decoding scheme is used in a turbo decoding, it is possible to easily obtain probability information of a received signal which is helpful to correct a phase. As a representative example, there is an external single estimator using an extrinsic soft output information outputted in a turbo decoding in order for phase estimation. The external single estimator uses a Least Mean Square (LMS) algorithm having a fixed step size.

It is preferable that a channel estimation method is optimal to both estimation accuracy and convergence speed. However, the estimation accuracy and the convergence speed are in a tradeoff relationship. Specifically, in case of the LMS algorithm having the fixed step size, if the step size is increased according to high-speed fading environment or frequency error size, the tracking speed is increased but the accuracy is decreased. The "tracking" means following the phase variation when the phase is not at a constant value but is continuously changed.

However, in a mobile channel environment and a Doppler-shift environment based on time, the receiver does not have information on fast varying channel and terminal. Thus, the LMS algorithm having the fixed step size is not optimized.

SUMMARY OF THE INVENTION

An embodiment of the present invention is directed to solving a problem that a convergence speed is increased and a tracking accuracy is decreased in mobile channel environment and Doppler-shift environment based on time.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

To solve the above problem, the present invention variably applies a step size for phase error estimation according to channel status.

In accordance with an aspect of the present invention, there is provided an apparatus for estimating a phase error, the apparatus including: a posterior probability (APP) average calculating unit for calculating an APP average value from a soft decision result of a currently received symbol; a step size determining unit for determining a step size variably according to channel status; and a phase error estimating unit for estimating a phase error of the currently received symbol from a phase error of a previously received symbol and the APP average value by using the variably determined step size.

In accordance with an aspect of the present invention, there is provided a method for estimating a phase error, the method comprising: calculating an APP average value from a soft decision result of a currently received symbol; determining a step size variably according to channel status; and estimating a phase error of the currently received symbol from a phase error of a previously received symbol and the APP average value by using the variably determined step size.

BRIEF DESCRIPTION OF THE DRAWINGS

FIGS. 9A to 9C are graphs showing bit error rate (BER) of phase estimation at a specific fixed phase error ($\beta_c$) according to SNR variation.

FIGS. 10A to 10C are graphs for explaining BER of phase estimation at a specific residual frequency error ($\beta_v$) according to SNR variation.

DESCRIPTION OF SPECIFIC EMBODIMENTS

The advantages, features and aspects of the invention will become apparent from the following description of the embodiments with reference to the accompanying drawings, which is set forth hereinafter. The technical spirit of the invention will be carried out by those skilled in the art. Also, detailed descriptions related to well-known functions or configurations will be ruled out in order not to unnecessarily obscure subject matters of the invention. Hereinafter, the embodiments of the present invention will be described with reference to the accompanying drawings.

Figure 1:
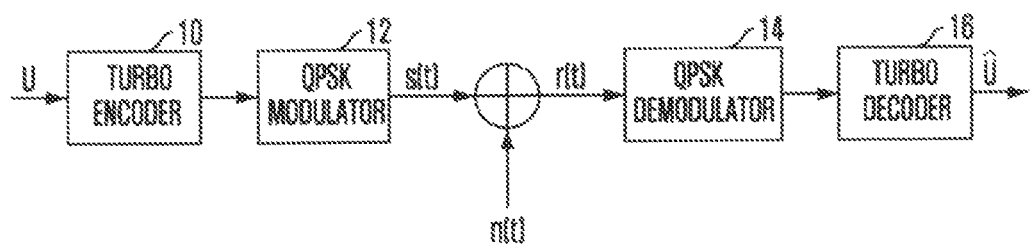
FIG. 1 illustrates an architecture of a Digital Video Broadcasting-Return Channel System via Satellite (DVB-RCS) standard system.

FIG. 1 illustrates an architecture of a DVB-RCS standard system.

Figure 2:
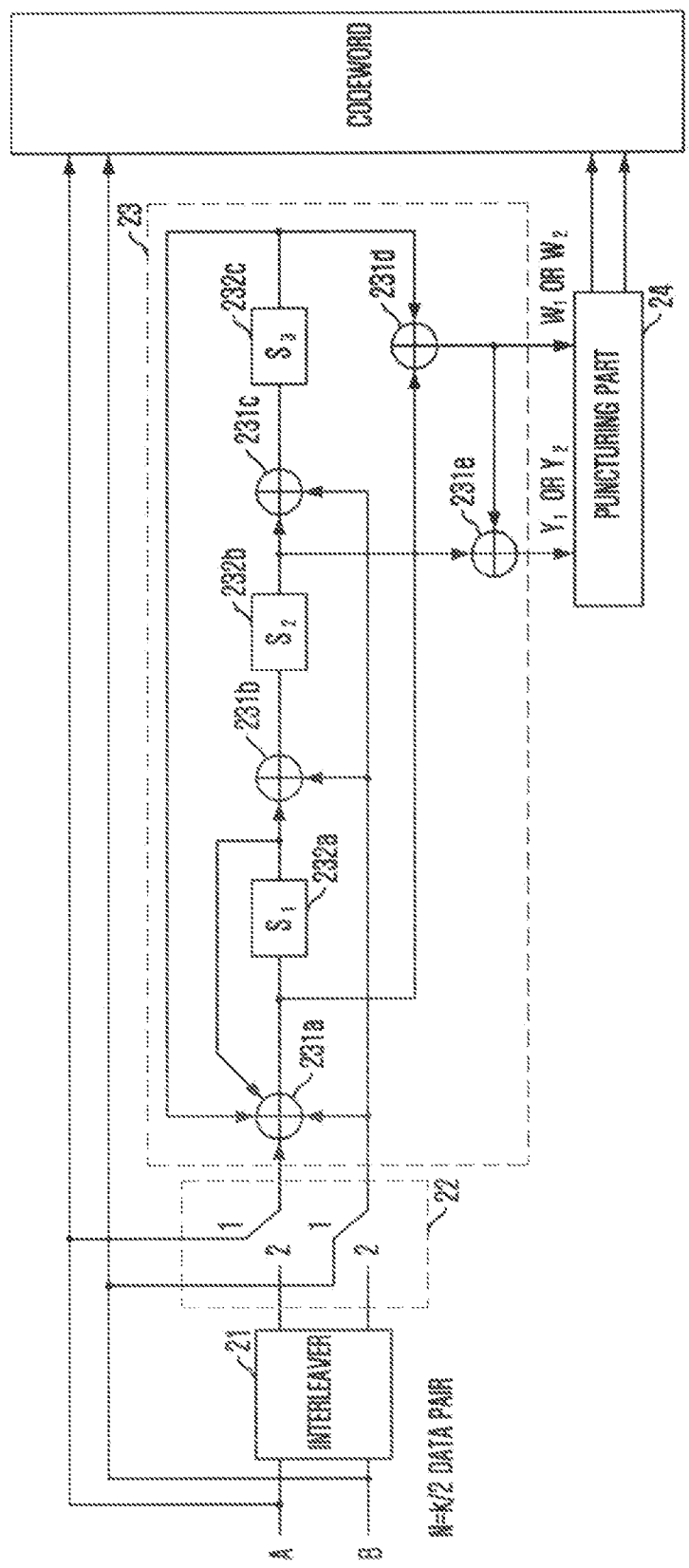
FIG. 2 illustrates an architecture of a DVB-RCS standard turbo encoder.

Referring to FIG. 1, a transmitting side of the Digital Video Broadcasting-Return Channel System via Satellite (DVB-RCS) standard system includes a turbo encoder 10 and a Quadrature Phase-Shift Keying (QPSK) modulator 12, and a receiving side of the DVB-RCS standard system includes a QPSK demodulator 14, and a turbo decoder 16. In the DVB-RCS standard, Additive White Gaussian Noise (AWGN) channel environment and QPSK modulation/demodulation scheme are used. FIG. 2 illustrates the architecture of a DVB-RCS standard turbo encoder, specifically, the turbo encoder 10 of FIG. 1.

Referring to FIG. 2, the turbo encoder 10 includes an interleaver 21, a switch 22, a double binary circular recursive systematic convolutional (CRSC) encoder 23, and a puncturing part 24.

The double binary CRSC encoder 23 includes five modulo-2 adders 231a to 231e and three delays 232a to 232c connected in series. The double binary CRSC encoder 23 receives data bits to output two first parity bit streams $Y_1$ and $W_1$, or receives data bits interleaved by the interleaver 21 to output two second parity bit streams $Y_2$ and $W_2$. The parity bit streams $Y_1$ and $W_1$, $Y_2$ and $W_2$ are inputted to the puncturing part 24.

To be specific, encoded data sequence including k data bits is inputted to the double binary CRSC encoder 23. One of the inputted data is the original data bit itself (in case where the switch is positioned at "1"), another is the data bit interleaved at the interleaver 21 by time change function Π (permutation) (in case where the switch is positioned at "2").

The turbo encoder 10 receives a block of k bits or N pairs (k=2×N bits). N is a multiple of 4 (k is a multiple of 8). After mapping of burst preamble, a most significant bit (MSB) of the first bit is allocated to A, and a next bit is allocated to B.

When the switch is positioned at "1", the data bits allocated to A and B are inputted to the double binary CRSC encoder 23. The double binary CRSC encoder 23 output two first parity bit streams $Y_1$ and $W_1$. The modulo-2 adder 231d performs a modulo-2 addition on the output bit of the modulo-2 adder 231a and the output bit of the third delay 232c. Thus, the polynomial expression of the second bit stream $W_1$ is equal to $1+D^3$. The modulo-2 adder 231e performs a modulo-2 addition on the output bit of the modulo-2 adder 231d and the output bit of the second delay 232b. Thus, the polynomial expression of the first bit stream $Y_1$ is equal to $1+D^2+D^3$.

Meanwhile, when the switch is positioned at "2", the data bits allocated to A and B are interleaved by the interleaver 21 and are inputted to the double binary CRSC encoder 23. The double binary CRSC encoder 23 outputs two first parity bit streams $Y_2$ and $W_2$. The modulo-2 adder 231d performs a modulo-2 addition on the output bit of the modulo-2 adder 231a and the output bit of the third delay 232c. Thus, the polynomial expression of the second bit stream $W_2$ is equal to $1+D^3$. The modulo-2 adder 231e performs a modulo-2 addition on the output bit of the modulo-2 adder 231d and the output bit of the second delay 232b. Thus, the polynomial expression of the first bit stream $Y_2$ is equal to $1+D^2+D^3$.

In view of the order of data outputted to the next stage (QPSK modulator) after the encoding operation of the turbo encoder 10, all (A, B) pairs are outputted and punctured by the puncturing part 24. Then, the remaining $(Y_1, Y_2)$ pairs are outputted, and the $(W_1, W_2)$ pairs remaining after the puncturing are outputted. On the other hand, in the reverse order, the $(Y_1, Y_2)$ pairs are outputted and the $(W_1, W_2)$ pairs are outputted. Then, the (A, B) pairs are outputted.

Figure 3:
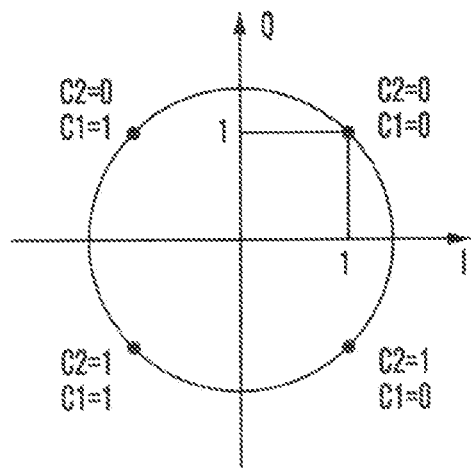
FIG. 3 illustrates a bit mapping to QPSK coordinates.

FIG. 3 illustrates a bit mapping to QPSK coordinates, specifically a bit mapping at the QPSK modulator 12.

As illustrated in FIG. 3, the QPSK modulator 12 bit-maps the encoded data pair, which are outputted from the turbo encoder 10, to one QPSK coordinate. Since a channel encoding is generally performed in order to correct a channel error, (C1, C2) represents that the encoded data pairs outputted from the turbo encoder 10 are channel-coded.

Figure 4:
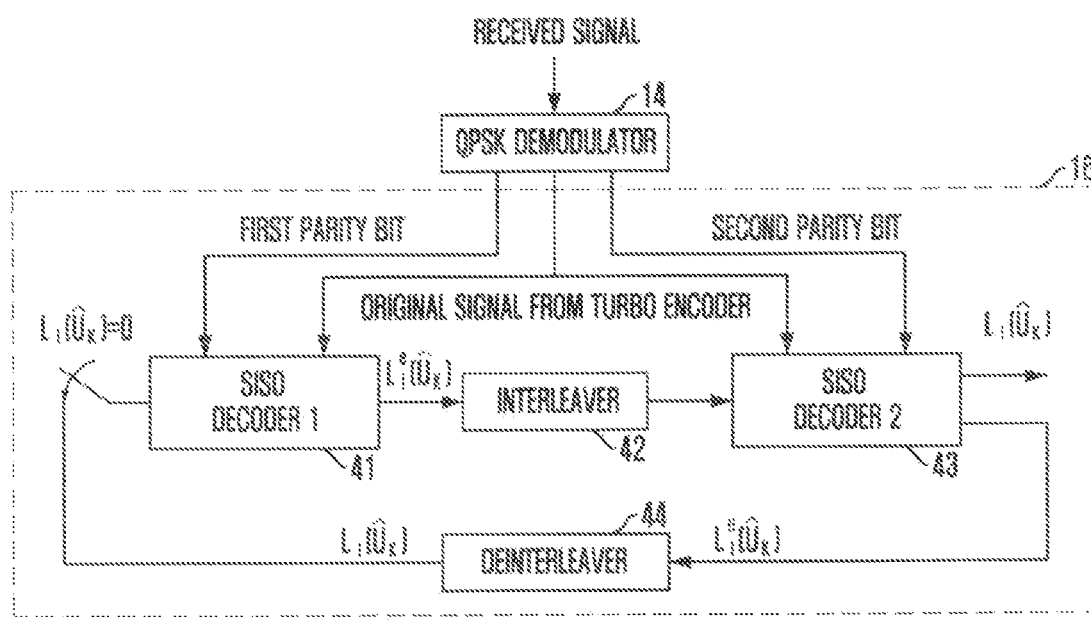
FIG. 4 illustrates an architecture of a turbo decoder at a receiving side.

FIG. 4 illustrates an architecture of the turbo decoder at the receiving side, which has iterative decoding procedures.

"Successive data bits" and "parity bits" (parity bits generated by the turbo encoder 10) transmitted together over the channel are inputted to the turbo decoder 16 as input values. The turbo decoder 16 classifies the inputted bits into data bits and parity bits through a trellis multiplexer (not shown) and inputs them to soft input soft output (SISO) decoders 41 and 43.

The turbo decoder 10 repeats the decoding operation using the data bits and the parity bits, together with previous data generated from a previous SISO decoder, and repeats the decoding operation on added additional data by comparing with the result value of the previous decoder. In this way, the reliability of the result value is increased.

In the turbo decoding procedure, the interleaver 42 and the deinterleaver 44 disperse burst error. That is, the interleaver 42 and the deinterleaver 44 minimize the correlation of data information used in the data recovery or parameter estimation.

In the turbo decoder 16, the two SISO decoders 41 and 43 perform the iterative decoding operation of a predetermined number of times, and the SISO decoder 43 generates soft output information. The generated soft output information passes through a hard decision operation of a hard decider (not shown) of the turbo decoder 16 and is outputted as a final value. The SISO decoders 41 and 43 use a MAX-Log-MAP algorithm. The Maximum A-posteriori Probability (MAP) algorithm corresponds to a trellis decoding algorithm like a Viterbi algorithm and is an optimal algorithm in theory. However, the MAP algorithm is complex in computation due to a plurality of multiplications and exponential operations, and requires a lot of memories. To solve those limitations, Log-MAP and MAX-Log-MAP algorithms have been proposed. The Log-MAP algorithm transforms the multiplication into the addition by using characteristics of log operations and remarkably reduces the exponential operation. The MAX-log-MAP algorithm is a semi-optimal algorithm which is an approximation of the Log-MAP algorithm.

Figure 5:
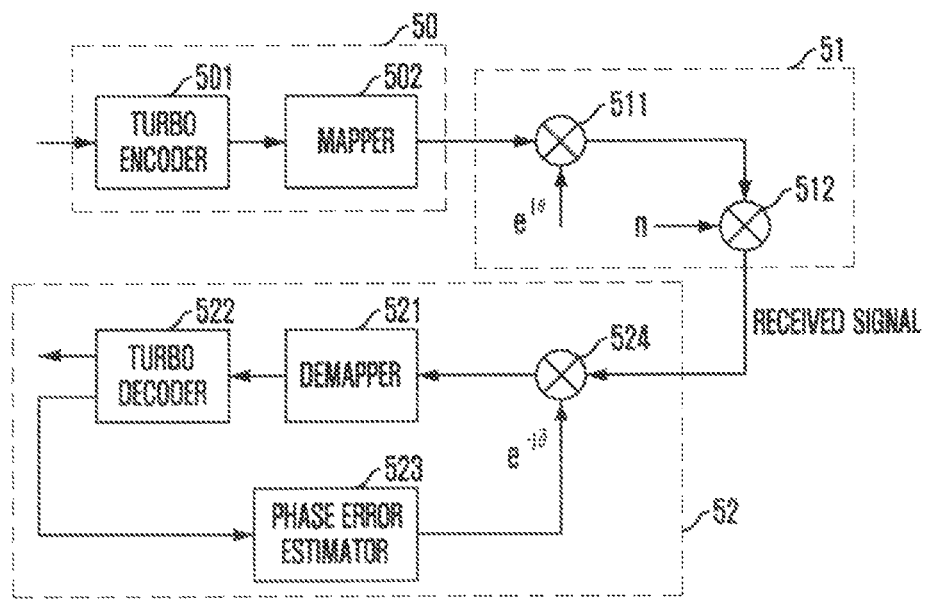
FIG. 5 illustrates an architecture of a carrier recovery system based on a turbo decoding in accordance with an embodiment of the present invention.

FIG. 5 illustrates an architecture of a carrier recovery system based on a turbo decoding in accordance with an embodiment of the present invention.

A transmission system 50 of a transmitting side includes a turbo encoder 501 (see FIG. 2) performing a recursive systematic convolution (RSC) encoding, and a mapper 502 maps bits, which are combined with actual data bits and parity bits of the turbo encoder 501, to symbols.

Carrier frequency error and phase error 511 are generated and AWGN 512 is added in the signals transmitted from the transmission system 50 to a receiving side through a channel.

A carrier recovery system 52 in accordance with an embodiment of the present invention includes a demapper 521, a turbo decoder 522 (see FIG. 4), a phase error estimator 523, and a phase compensator 524. The phase error estimator 523 is provided outside of the turbo decoder 522, and the phase error of the received symbol is corrected by estimating the phase of the transmitted symbol using extrinsic information probability information outputted from the turbo decoder 522.

Since the external single estimation scheme is a scheme in which the phase error estimator is added outside the turbo decoder 522, it is unnecessary to modify the internal structure of the SISO block which is a basic block of the turbo decoder.

The external signal estimator, that is, the phase error estimator 523, estimates the phase error using the extrinsic soft output information outputted in the turbo decoding of the turbo decoder 522. The phase error estimator 523 may use a Maximum Likelihood (ML) scheme and a Least Mean Square (LMS) scheme as the phase error estimation scheme.

The phase compensator 524 compensates for the phase error of the received signal with the phase error estimated by the phase error estimator 523.

Figure 6:
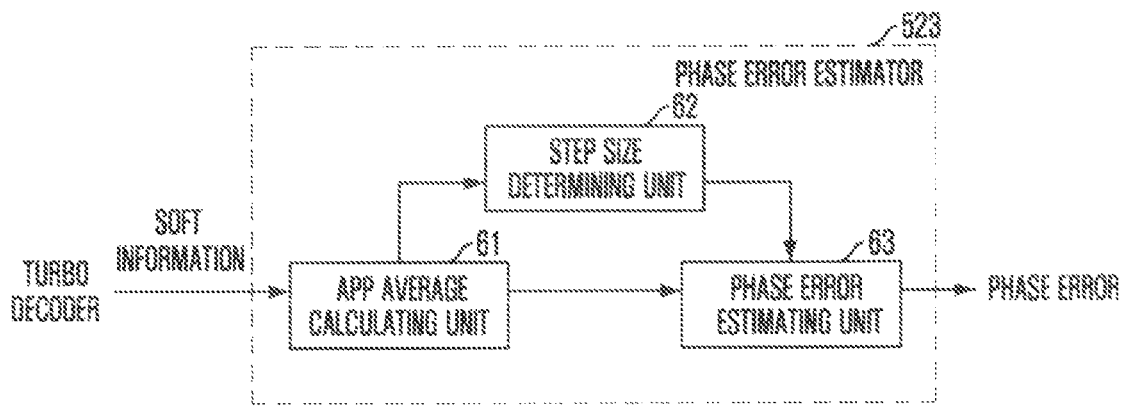
FIG. 6 illustrates an architecture of a phase error estimator using a variable step size in accordance with an embodiment of the present invention.

FIG. 6 illustrates an architecture of the phase error estimator using a variable step size in accordance with an embodiment of the present invention.

Referring to FIG. 6, the phase error estimator 523 includes an A-posterior probability (APP) average calculating unit 61, a step size determining unit 62, and a phase error estimating unit 63.

The APP average calculating unit 61 calculates an APP average value from the soft decision result of the currently received symbol, that is, the soft output information generated by the turbo decoder 522, which will be described later with reference to FIG. 7.

The step size determining unit 62 determines the step size variously according to the channel status, which will be described later with reference to FIG. 8.

The phase error estimating unit 63 estimates the phase error of the currently received symbol, based on the phase error of the previously received symbol and the APP average value calculated by the APP average calculating unit 61, by using the step size variably determined by the step size determining unit 62, which will be described later with reference to FIG. 8.

Figure 7:
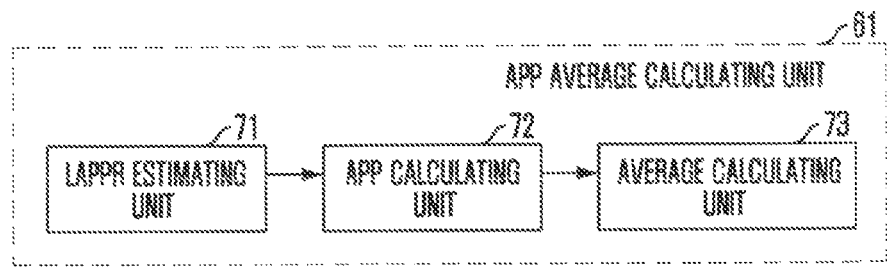
FIG. 7 illustrates an architecture of an APP average calculating unit of FIG. 6 in accordance with an embodiment of the present invention.

FIG. 7 illustrates an architecture of the APP average calculating unit of FIG. 6 in accordance with an embodiment of the present invention.

Referring to FIG. 7, the APP average calculating unit 61 includes a Long A Posterior Probability Ratio (LAPPR) estimating unit 71, an APP calculating unit 72, and an average calculating unit 73.

The LAPPR estimating unit 71 converts the soft output information generated and transmitted from the turbo decoder 522 into an LAPPR value and estimates a negative log probability value (probability information) of each transport symbol.

The APP calculating unit 72 calculates an APP value by applying a negative exponential function on each transport symbol.

The average calculating unit 73 calculates an average value of each transport symbol by using wholly, partially or selectively the probability information of the transmission signal generated by the turbo decoder according to probability information use types, for example, APP total average scheme, APP partial average scheme, or APP maximum value selection scheme. The APP total average scheme calculates probabilities with respect to all symbols on QPSK coordinates in order to estimate whether which symbol of QPSK the received signal is transmitted to, and calculates an average value of the probabilities. The APP partial average scheme calculates an average value by using only one modulation symbol having high relevancy among L modulation symbols (where $L \geq 1$), without using all LAPPR values outputted from the turbo decoder. The APP maximum value selection scheme uses, as the average value, the symbol having the highest relevancy among all LAPPR values outputted from the turbo decoder.

Figure 8:
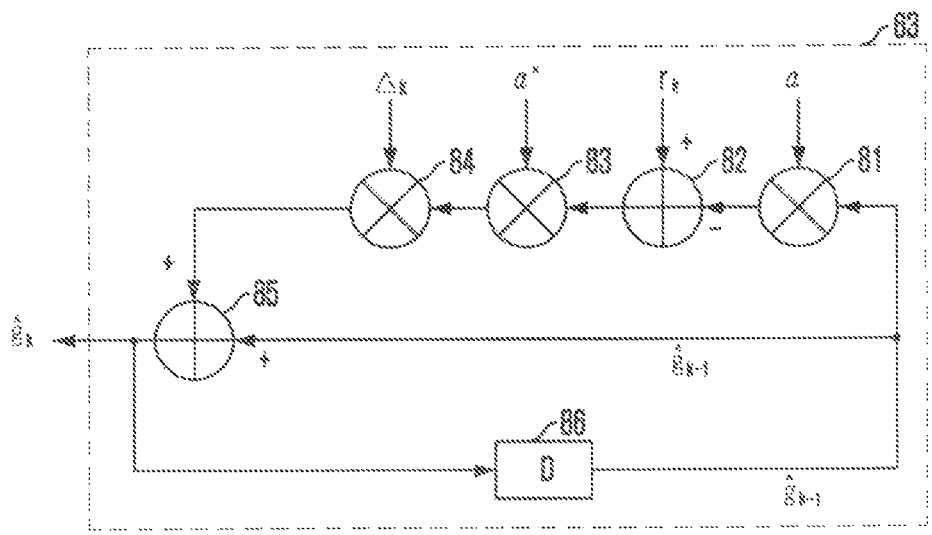
FIG. 8 illustrates an architecture of a phase error estimating unit of FIG. 6 in accordance with an embodiment of the present invention.

FIG. 8 illustrates an architecture of the phase error estimating unit of FIG. 6 in accordance with an embodiment of the present invention.

Assuming that the currently received signal at the receiving stage is $r_k$, the received signal may be modeled as expressed in Equation 1 (see 51 of FIG. 5).

$$r_k = c_k e^{j\theta_k} + n_k \qquad \text{Eq. 1}$$

where $c_k$ is a unit symbol of a QPSK symbol (modulation symbol);

$n_k$ is a complex Gaussian noise having an average value of "0"; and $\theta_k$ is an unknown carrier phase error to be estimated.

The carrier phase error relevant to the present invention is expressed as Equations 2 and 3.

$$\theta = \beta_c + \phi \qquad \text{Eq. 2}$$

$$\theta = \beta_v \times k + \phi \qquad \text{Eq. 3}$$

where $\beta_c$ is a fixed phase error;

$\beta_v$ is a residual frequency error which increases in a unit symbol; and $\phi$ is a phase noise.

In order to estimate the phase error, the conventional phase error estimator (external signal estimator) uses an LMS algorithm expressed as Equation 4.

$$\hat{g}_k = \hat{g}_{k-1} + \Delta(r_k - \hat{g}_{k-1}\alpha)\alpha^* \qquad 4$$

where $\hat{g}_k$ is an exponential expression of an estimated phase error $\hat{\theta}_k$ of a k-th time index;

$\hat{g}_{k-1}$ is an exponential expression of an estimated phase error of a (k−1)-th time index;

$r_k$ is a currently received signal received through a channel; and $\Delta$ is a step size for converging the phase error compensation operation.

$\alpha$ is an APP average value of $c_k$ and can be calculated based on the soft information generated by the turbo decoder.

The conventional LMS algorithm having the fixed step size is easy to implement and has good performance in comparison with small computation amount. However, if the step size is not appropriate, the channel estimation is difficult and the tracking capability is lowered in mobile channel environment where channel status varies with time.

Therefore, the variable step size-LMS (VS-LMS) algorithm in accordance with the embodiment of the present invention can remarkably enhance the convergence speed and the tracking capability even though the computation amount is slightly increased in comparison with the conventional LMS algorithm. This can be expressed as Equation 5 below.

$$\hat{g}_k = \hat{g}_{k-1} + \Delta_k(r_k - \hat{g}_{k-1}\alpha)\alpha^* \qquad \text{Eq. 5}$$

where $\hat{g}_{k-1}, \hat{g}_k, r_k, \alpha$ are variables used in the existing single estimator; and $\Delta_k$ is a variable step size.

Equation 5 above will be described with reference to FIG. 8. If the operations "81" and "82" are performed on the phase error $\hat{g}_{k-1}$ of the previously received symbol ((k−1)-th symbol), $r_k - \hat{g}_{k-1}\alpha$ is outputted. If the operations "83" and "84" are performed on $r_k - \hat{g}_{k-1}\alpha$, $\Delta_k(r_k - \hat{g}_{k-1}\alpha)\alpha^*$ is outputted. By adding $\Delta_k(r_k - \hat{g}_{k-1}\alpha)\alpha$ to $\hat{g}_{k-1}$ (operation 85), the phase error of the currently received symbol (k-th symbol) can be calculated. After the calculated phase error passes through the delay 86, it is used for estimating the phase error of the next symbol ((k+1)-th symbol).

A method for determining a variable step size in accordance with an embodiment of the present invention will be described below.

The variable step size $\Delta_k$ can be calculated using Equation 6. That is, the variable step size $\Delta_k$ related to the phase error estimation can be calculated by normalizing $r_k - \hat{g}_{k-1}\alpha$ using an absolute value of $r_k$.

$$\Delta_k = \frac{r_k - \hat{g}_{k-1}\alpha}{|r_k|} \cdot \Delta_{max} \qquad \text{Eq. 6}$$

If the variable step size $\Delta_k$ of Equation 6 is separately expressed with an in-phase (I) channel and a quadrature (Q) channel, it is expressed as Equation 7. That is, using the APP average value and the phase error of the previously received symbol, the step size is variably determined within a range that does not exceed the maximum value $\Delta_{max}$.

$$\Delta_{I_k} = \frac{|r_{I_k} - \hat{g}_{I_{k-1}} \cdot \alpha_{I_k} + \hat{g}_{Q_{k-1}} \cdot \alpha_{Q_k}|}{|r_{I_k}|} \Delta_{max} \qquad \text{Eq. 7}$$

$$\Delta_{Q_k} = \frac{|r_{I_k} - \hat{g}_{I_{k-1}} \cdot \alpha_{I_k} + \hat{g}_{Q_{k-1}} \cdot \alpha_{Q_k}|}{|r_{Q_k}|} \Delta_{max}$$

where $\Delta_{max}$ represents the maximum value of the step size.

If the normalization is performed using the absolute values of I-channel component and Q-channel component of the received signal $r_k$, the step sizes $\Delta_{I_K}$ and $\Delta_{Q_k}$ related to the phase estimation are determined.

Although the values calculated from Equations 6 and 7 may be used as the variable step sizes, the final step sizes can be determined by further performing the procedure of Equation 8 in accordance with other embodiments. By using a step size update variable $\beta(0<\beta<1)$, it is possible to prevent the phase error from being changed according to presence/absence of noise.

That is, by comparing the step size obtained using Equation 6 with the step size used in the phase error estimation of the previously received symbols, the step size is adjusted like Equation 8. The current step size (k-th step size) is increased or decreased according to the comparison result of the (k−1)-th step size (variation amount of the step size). However, if the step size does not fall within the following conditions, the current step size (k-th step size) calculated using Equation 6 is used as it is.

$$\Delta_k = \begin{cases} \beta \cdot \Delta_{k-1}, & \text{if } \Delta_k < \beta \cdot \Delta_{k-1} \\ \Delta_{k-1}/\beta, & \text{if } \Delta_k > \Delta_{k-1}/\beta \end{cases} \qquad \text{Eq. 8}$$

Figure 9A:
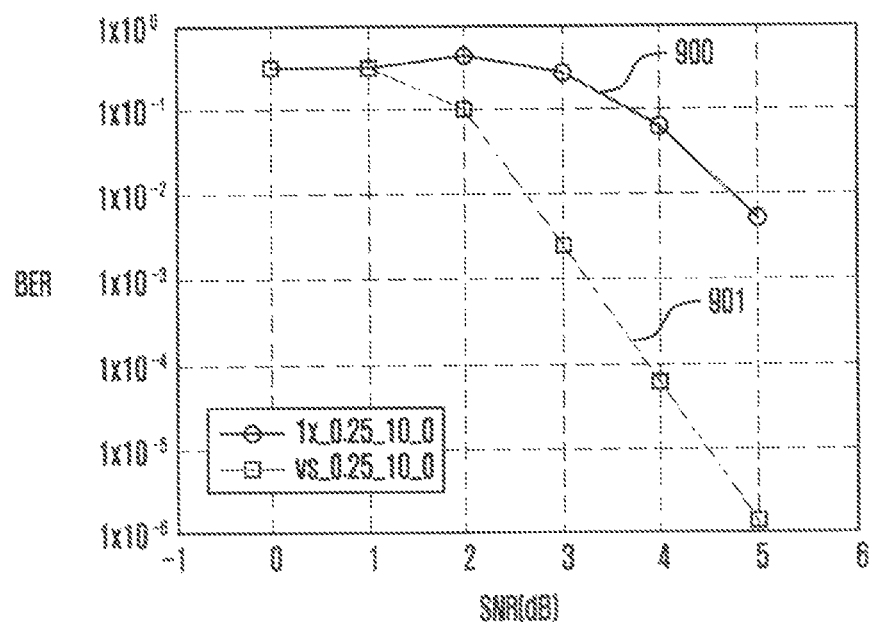
Figure 9B:
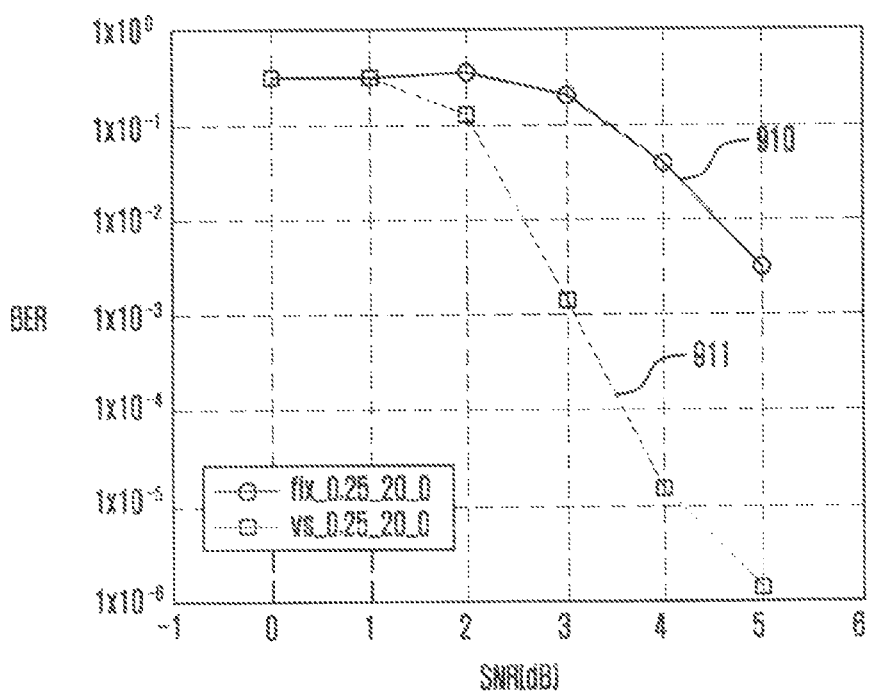

FIGS. 9A to 9C are graphs showing bit error rate (BER) of phase estimation at a specific fixed phase error ($\beta_c$) according to SNR variation. It is assumed that the maximum value $\Delta_{max}$ of the step size is 0.25, and the step size update variable $\beta$ is 0.996.

FIGS. 9A, 9B and 9C illustrate the BER values with respect to SNR when $\beta_c=10$, $\beta_c=20$, and $\beta_c=30$, respectively. In FIGS. 9A to 9C, "900", "910" and "920" represent the cases of using the conventional fixed step size, and "901", "911" and "921" represent the cases of using the variable step size in accordance with the embodiment of the present invention.

For example, vs_0.25_20_0 represents the BER curve in a channel environment in which the phase error rotation is 0.25 per symbol, the dispersion in a phase noise model is 20 degrees, and a phase noise is 0.

The case of using the fixed phase error model ($\beta_c$ use model) exhibits better performance than the conventional LMS algorithm. However, when $\beta_c$ is more than 30 degrees, the phase correction is very difficult.

Figure 10A:
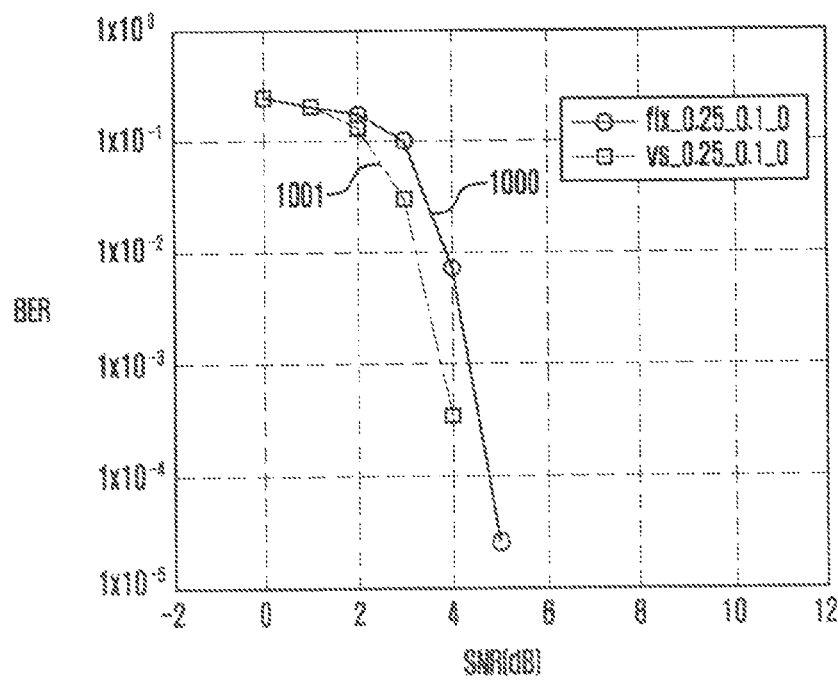
Figure 10B:
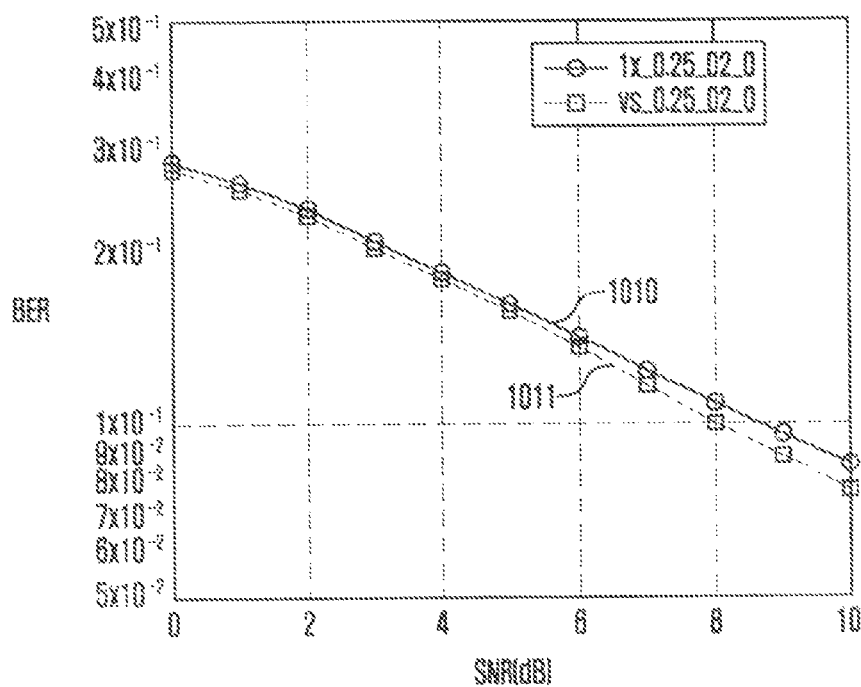

FIGS. 10A to 10C are graphs for explaining BER of phase estimation at a specific residual frequency error ($\beta_v$) according to SNR variation. It is assumed that the maximum value $\Delta_{max}$ of the step size is 0.25, and the step size update variable $\beta$ is 0.996.

Specifically, FIGS. 10A, 10B and 10C illustrate the BER values with respect to SNR when $\beta_v=0.1$, $\beta_v=0.2$, and $\beta_v=0.36$, respectively. In FIGS. 10A to 10C, "1000", "1010" and "1020" represent the cases of using the conventional fixed step size, and "1001", "1011" and "1021" represent the cases of using the variable step size in accordance with the embodiment of the present invention.

When the incremental phase error model ($\beta_v$ use model) is used, the case of $\beta_v=0.1$ exhibits better performance than the existing LMS algorithm. However, it can be seen that the cases of $\beta_v=0.2$ and $\beta_v=0.36$ exhibit almost the same performance as the existing LMS algorithm.

Generally, since the LMS algorithm is sensitive to white Gaussian noise and impulse noise, error occurs much more than the case where only inter-symbol interference (ISI) exists. However, in accordance with the embodiments of the present invention, such an influence can be reduced because the phase error method (VS-LMS method) determines the step size according to the channel status.

In accordance with the embodiments of the present invention, since the external single estimator based on iterative decoding in the turbo code is implemented using the LMS algorithm having the variable step size, the convergence speed and estimation accuracy performance can be enhanced more remarkably than the LMS algorithm having the fixed step size.

Furthermore, the synchronization performance can be enhanced by using the external single estimation method to which the VS-LMS algorithm having the variable step size is applied.

The methods in accordance with the embodiments of the present invention can also be realized as computer programs. Codes and code segments constituting the programs can be easily derived by computer programmers skilled in the art to which the present invention pertains. Furthermore, the programs are stored in computer-readable recording media (data storage media) and are read and executed by a computer. The recording media may include any storage device that can be read by a computer.

While the present invention has been described with respect to the specific embodiments, it will be apparent to those skilled in the art that various changes and modifications may be made without departing from the spirit and scope of the invention as defined in the following claims.

What is claimed is:

1. An apparatus for estimating a phase error, the apparatus comprising:
   a posterior probability (APP) average calculating unit for calculating an APP average value from a soft decision result of a currently received symbol;
   a step size determining unit for variably determining a step size according to channel status; and
   a phase error estimating unit for estimating a phase error of the currently received symbol from a phase error of a previously received symbol and the APP average value by using the variably determined step size.

2. The apparatus of claim 1, wherein the soft decision result comprises soft output information generated in a decoding operation of a turbo decoder.

3. The apparatus of claim 1, wherein the APP average value is calculated according to any one of an APP total average scheme, an APP partial average scheme, and an APP maximum value selection scheme.

4. The apparatus of claim 1, wherein the step size determining unit determines the step size variably within a range that does not exceed a predetermined maximum value by using the phase error of the previously received symbol and the APP average value.

5. The apparatus of claim 4, wherein the step size determining unit determines the step size by normalizing a difference value between a currently received signal and a value given by multiplying the phase error of the previously received symbol by the APP average value, with respect to the currently received signal.

6. The apparatus of claim 5, wherein the step size determining unit further performs a function of adjusting the determined step size by using a variation amount of the step size and a predetermined step size update variable.

7. A method for estimating a phase error, the method comprising:
  calculating an APP average value from a soft decision result of a currently received symbol;
  variably determining a step size according to channel status; and
  estimating a phase error of the currently received symbol from a phase error of a previously received symbol and the APP average value by using the variably determined step size.

8. The method of claim 7, wherein the soft decision result comprises soft output information generated in a decoding operation of a turbo decoder.

9. The method of claim 7, wherein the APP average value is calculated according to any one of an APP total average scheme, an APP partial average scheme, and an APP maximum value selection scheme.

10. The method of claim 7, wherein the step size is variably determined within a range that does not exceed a predetermined maximum value by using the phase error of the previously received symbol and the APP average value.

11. The method of claim 10, wherein the step size is determined by normalizing a difference value between a currently received signal and a value given by multiplying the phase error of the previously received symbol by the APP average value, with respect to the currently received signal.

12. The method of claim 11, wherein said determining the step size further comprises:
  performing a process of adjusting the determined step size by using a variation amount of the step size and a predetermined step size update variable.

* * * * *